(12) United States Patent
Berndt

(10) Patent No.: US 6,288,458 B1
(45) Date of Patent: Sep. 11, 2001

(54) POWER STEALING SOLID STATE SWITCH

(75) Inventor: Dale F. Berndt, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/408,638

(22) Filed: Sep. 30, 1999

(51) Int. Cl.$^7$ .................................................. H01H 35/00
(52) U.S. Cl. .......................... 307/130; 307/39; 307/126
(58) Field of Search .............................. 307/39, 130, 131, 307/126; 250/551; 219/492; 323/282, 322

(56) References Cited

U.S. PATENT DOCUMENTS

| 3,681,569 | * | 8/1972 | Schwarz | 219/492 |
| 4,065,721 | * | 12/1977 | Rabe | 328/1 |
| 4,390,790 | * | 6/1983 | Rodriguez | 250/551 |
| 5,349,253 | * | 9/1994 | Ngo et al. | 307/475 |
| 5,456,407 | * | 10/1995 | Stalsberg et al. | 236/46 |
| 5,736,795 | * | 4/1998 | Zuehlke et al. | 307/130 |
| 5,903,139 | * | 5/2000 | Kompelien | 323/282 |

\* cited by examiner

Primary Examiner—Stephen W. Jackson
Assistant Examiner—Sharon Polk
(74) Attorney, Agent, or Firm—John G. Shudy, Jr.; Andrew A. Abeyta

(57) ABSTRACT

A mechanically actuated power stealing solid state low energy switch providing a drop-in replacement for low energy mechanical switches. The present switch eliminates disadvantages of the mechanical switches. Power stealing is done on a constant basis to eliminate spikes, which might interfere with digital logic. Stealing logic with no diode drops allows low power operation on single CMOS substrate and omni-directional hook-up of a power supply with the most negative voltage being directed to the substrate. Hysteresis for the solid state switch is provided to mimic mechanical switch operation but without chatter of the latter.

20 Claims, 15 Drawing Sheets

TRUTH TABLE FOR LOGIC 35

| INPUTS ||||||| OUTPUTS ||||||||| COMMENTS |||
|---|---|---|---|---|---|---|---|---|---|---|---|---|---|---|---|---|
| VCC MONITOR | PLUNGER POSITION | NC | C | NO | NC P-FET 49 | NO P-FET 51 | NC N-FET 53 SW1 | NC N-FET 53 SW2 | C N-FET 55 SW1 | C N-FET 55 SW2 | NO N-FET 57 SW1 | NO N-FET 57 SW2 | NO N-FET 57 SW3 | WIRES | CURRENT DIRECTION NC/C/NO | COMB |
| HM | OUT | LT | LT | HT | LP | HP | CLSD | OPEN | CLSD | OPEN | OPEN | OPEN | OPEN | 3 | +/−/+ | 1 |
| HM | IN | HT | LT | LT | HP | LP | OPEN | CLSD | CLSD | OPEN | CLSD | OPEN | OPEN | 3 | +/−/+ | 1 |
| HM | OUT | HT | HT | LT | LP | HP | OPEN | CLSD | OPEN | CLSD | OPEN | CLSD | OPEN | 3 | −/+/− | 2 |
| HM | IN | LT | HT | HT | HP | LP | OPEN | CLSD | OPEN | CLSD | CLSD | OPEN | OPEN | 3 | −/+/− | 2 |
| HM | OUT | HT | LT | HT | LP | HP | OPEN | CLSD | CLSD | OPEN | OPEN | CLSD | OPEN | 3 | −/+/+ | 3 |
| HM | IN | HT | HT | LT | HP | LP | CLSD | OPEN | OPEN | CLSD | CLSD | OPEN | OPEN | 3 | +/+/− | 4 |
| HM | OUT | LT | LT | HT | LP | HP | OPEN | CLSD | CLSD | OPEN | OPEN | OPEN | OPEN | 3 | −/+/+ | 5 |
| HM | IN | LT | LT | HT | HP | LP | OPEN | CLSD | OPEN | OPEN | OPEN | CLSD | NO | 2 | 0/−/+ | 6 |
| HM | OUT | X | LT | HT | X | HP | X | X | CLSD | OPEN | OPEN | OPEN | C | 2 | 0/−/+ | 7 |
| HM | IN | X | HT | LT | X | LP | X | X | OPEN | CLSD | CLSD | OPEN | NC | 2 | 0/−/+ | 7 |
| HM | OUT | X | LT | LT | X | HP | X | X | CLSD | OPEN | OPEN | CLSD | OPEN | 2 | 0/+/− | 8 |
| HM | IN | X | HT | HT | X | LP | X | X | OPEN | OPEN | CLSD | OPEN | C | 2 | 0/+/− | 8 |
| LM | OUT | HT | LT | X | HP | X | OPEN | OPEN | CLSD | OPEN | X | X | X | 2 | +/−/+ | 9 |
| LM | IN | HT | HT | X | HP | X | OPEN | CLSD | OPEN | OPEN | X | X | X | 2 | +/−/+ | 9 |
| LM | OUT | LT | LT | X | HP | X | CLSD | OPEN | CLSD | CLSD | X | X | OPEN | 2 | −/+/0 | 10 |
| HM | IN | LT | HT | X | HP | X | OPEN | CLSD | OPEN | CLSD | X | X | OPEN | 2 | −/+/0 | 10 |

FIG.14

POWER STEALING SOLID STATE SWITCH

BACKGROUND OF THE INVENTION

The present invention relates to low energy switches. The invention relates specifically to a mechanically actuated, power stealing, solid state switch providing a drop-in replacement for mechanical or electromechanical low energy switches.

Mechanical and/or electromechanical low energy switches, i.e., switches carrying low current at low voltage, designed for no-spark applications, e.g., 10 milliamperes (mA) at 5 volts (V) which may be used for small indicator lights, digital logic, or the like, suffer from corrosion build-up, oxidation, or contamination at their electrical contact points because there is not sufficient energy carried by the switch to create arcing or spark at the contacts in order to burn off the accumulation of contaminating material when the switch is actuated. Snap springs, armatures and like physical members are also subject to fatigue, assembly problems and packaging difficulties. Solid-state switches do not suffer from these problems.

Power stealing switches, which steal a small portion of power supplied to an actuated device and boost this stolen power to a voltage level sufficient to operate the power stealing switch, are known in certain contexts. The primary motivation for power stealing is to avoid rewiring of existing circuitry. In the art, there are power stealing switches, or parts thereof, in the context of thermostat control typically using twenty-four volt alternating current (AC) or ten-volt direct current (DC) at about 0.5 ampere. These switches steal power at the zero crossing points on the AC waveform. This opens the circuit for a short time and produces voltages that exceed the minimum digital logic low level, typically 0.5 volt. In the DC mode and with the switch on (ON) rather than off (OFF), the voltage is also greater than 0.5 volt. The related art has one or more voltage diode drops involved in the power stealing circuits and therefore does not allow operation in circuits with voltages as low as 1.5 volts.

It would therefore be desirable to provide a low power, solid state, two- or three-terminal switch with power stealing. Such a switch is further desirably connectable in any circuit configuration of current polarities and voltages ranging from 1.5 volts to 30 volts. A practical low power realization of a manually actuated, direct current, solid state switch of this type does not appear to be in the art.

SUMMARY OF THE INVENTION

Accordingly it is an object of the present invention to disclose a power stealing, solid state, manually actuated, drop-in replacement, low power switch for existing electromechanical low power switches. The switch design is preferably executed with a single IC substrate or die to be practical and economical.

In general the present invention preferably has an actuator assembly for mechanical operation of the switch, a power stealing section for supplying power to run the switch, a logic section for control of the switch functions, and output transistors acting to open and close the switch.

The actuator may comprise a plunger mechanically moving a variable capacitor, which is sensed and amplified with a built-in hysteresis to prevent ON/OFF cycling chatter. The power stealing circuit has little or no diode drop and has very low leakage and/or operating current in the OFF state, e.g., less than 50 microamperes, for operating a steering or control circuit. This circuit automatically steals power from the terminal with the highest voltage of the two or three terminals, and returns the current to the lowest voltage terminal or the lowest voltage at the IC (CMOS) substrate voltage level or ground. This thereby allows a direction-insensitive connection of the attached device, i.e., the switch's power supply, to the switch terminals. That is, the terminals are not dedicated, and the switch will work however it is connected to the device.

All functional groups of the present embodiment are designed to minimize power consumption of the solid state switch while providing a switch that can handle 1.5 to 30 volts DC and a 250 microampere ($\mu$A) to 100 mA load in the embodiment, or, generally, the maximum power permitted by the substrate or IC used. A 1.0 ampere ten-times inrush, nonrepetitive current capability for powering start-up of cold filament indicator lights is further provided. The maximum current can be increased by using larger output field effect transistors (FETs); however, this may necessitate an increase in the die size.

The switch circuitry detects and operates in the two-wire or three-wire mode. In the three-wire mode, the switch steals current in microamperes from the open terminal and provides an ON resistance in the milliohm range between the two remaining terminals. In the two-wire mode, the output of the device is clamped to less than 0.5 volt, or less than the digital logic low level for TTL or CMOS logic. This clamped ON voltage is then charge-pumped up to voltages sufficient to operate the internal circuitry of the switch.

The present embodiment details a combination two/three-terminal, single pole double throw (SPDT) style switch which steals only 0.5 VDC (ON state), and 50 $\mu$A maximum (OFF state) for operation. It can function as a two-terminal single pole, single throw style switch. The switch is easily shielded and sealed, and insensitive to current direction and voltage hookup to the terminals.

A solid state switch that has the same form, fit, and function as an electromechanical SPDT switch and offers high reliability in low energy applications. The solid state switch uses power stealing for circuit operation to perform all the functions of a SPDT switch including bi-directional current flow from any of the SPDT terminals. The three terminals of the SPDT switch can be connected in ten combinations of polarity (four combinations of polarity for the two wire single pole single throw (SPST) style switch having normally opened or normally closed contacts, and six combinations of polarity for the three-wire SPDT switch configurations). The switch employs efficient power stealing with no diode drops and therefore can work down to three volts. The present circuit can be implemented using a single die of conventional bulk CMOS.

The SPST is used with a two-wire operation. A charge pump that operates continuously on only 0.5 volts input and has an output of 2.5 volts (five-times charge pump). The input is less than a typical FET threshold voltage (1.0 volt). If the switch is commanded to be "ON" during the initial power up there is a delay of less than 500 $\mu$s to allow the charge pump to start. This time is less than the typical switching time of the equivalent mechanical switch (1 ms). Once the charge pump is running, the output voltage (2.5 volts) is used internally to run itself. At this time the input voltage can be clamped to 0.5 volts and still maintain the internal voltage of 2.5 volts.

The constant ON state voltage control is independent of load current. The ON state voltage is below the worst case digital logic low level.

There is on-chip polarity sensing for bi-directional operation. FETs operating in a reverse mode allow for polarity independent operation.

The SPDT can be used for three-wire operation. The three-terminal (SPDT) power stealing circuit is independent of polarity. This smart power stealing circuit seeks the most positive and most negative of the three terminals. The most negative terminal potential is assigned to the substrate potential voltage. Therefore, this switch can be implemented in conventional bulk CMOS without the use of silicon-on-insulator (SOI) technology or two dies to isolate the three terminals.

There is efficient power stealing with no diode drops. If all three terminals have different voltages by greater than the FET threshold voltage there are no diode drops. If the two input terminals have the same voltage, the output is reduced by only one diode drop. If no diode drops are needed, two of the two-terminal power stealing circuits can be used by switching them during the break before make time.

Break-before-make logic is used to perform the proper function of the SPDT. This also insures that the switch does not lose power during the transition time.

A circuit technique is used to drive large capacitive loads. An internal voltage monitor on the VCC-logic buss is used to lengthen the break before the make time to insure that the IC does not lose power during such transition time.

The present switch is a combined SPST and SPDT design. The combined SPST and SPDT designs operate in any combination of two- or three-wire connections and all polarities for ten combinations (four SPST plus six SPDT).

The switch has smart two- or three-wire detection. A voltage monitor on the internal logic voltage VCC-voltage buss is used to determine if the switch is in the two- or three-wire mode of operation. If the internal voltage falls below a preset value the output, transistors are blocked from turning fully ON. In this way, the switch avoids being starved of power when only two wires are used.

A micro powered variable capacitance pickoff is used to sense the plunger position. The capacitance sensor is designed with a DC offset such that if the plates of the capacitor make contact, the switch still functions in the normal manner. The capacitance pickoff is shielded to avoid pick up from stray fields. Electronic hysteresis is used to mimic the mechanical differential travel. Electronic hysteresis also provides for no contact bounce.

There is short circuit protection for operating in two-wire mode. The maximum current flowing through the switch is limited by monitoring the voltage across the clamped ON voltage of 0.5 volt. If this voltage increases by more than 20 percent (0.1 volt), the switch automatically opens.

Also, there is short circuit protection for operating in the three-wire mode. The maximum current flowing through the switch is limited by monitoring the voltage across the output transistor. If this voltage increases by more than 0.1 volt, the switch opens.

There is also over-voltage protection. If the voltage between any two terminals of the three-terminal switch approaches the maximum breakdown voltage for the IC process, the voltage is clamped to twenty percent less than the breakdown voltage. The die and package limit the total power dissipation.

The switch is primarily designed for DC operation but can be used for AC low frequency operation, 50 to 400 Hz. This is true if the AC frequency is low relative to the frequency response of the internal FETs.

The present switch offers a general purpose SPDT or SPST solid state direct replacement for an equivalent mechanical switch. The switch can be configured in any combination of voltage and current polarities. Loads can be connected from one to three terminals of the device in any combination. The switch is designed for a mechanical plunger input but the same basic circuits and ideas of power stealing can be used with different front-end electronics such as a capacitive proximity sensor.

BRIEF DESCRIPTION OF THE DRAWINGS

FIG. 14 exhibits a truth table for the solid state switch logic system.

DESCRIPTION OF THE EMBODIMENTS

Figure 1:
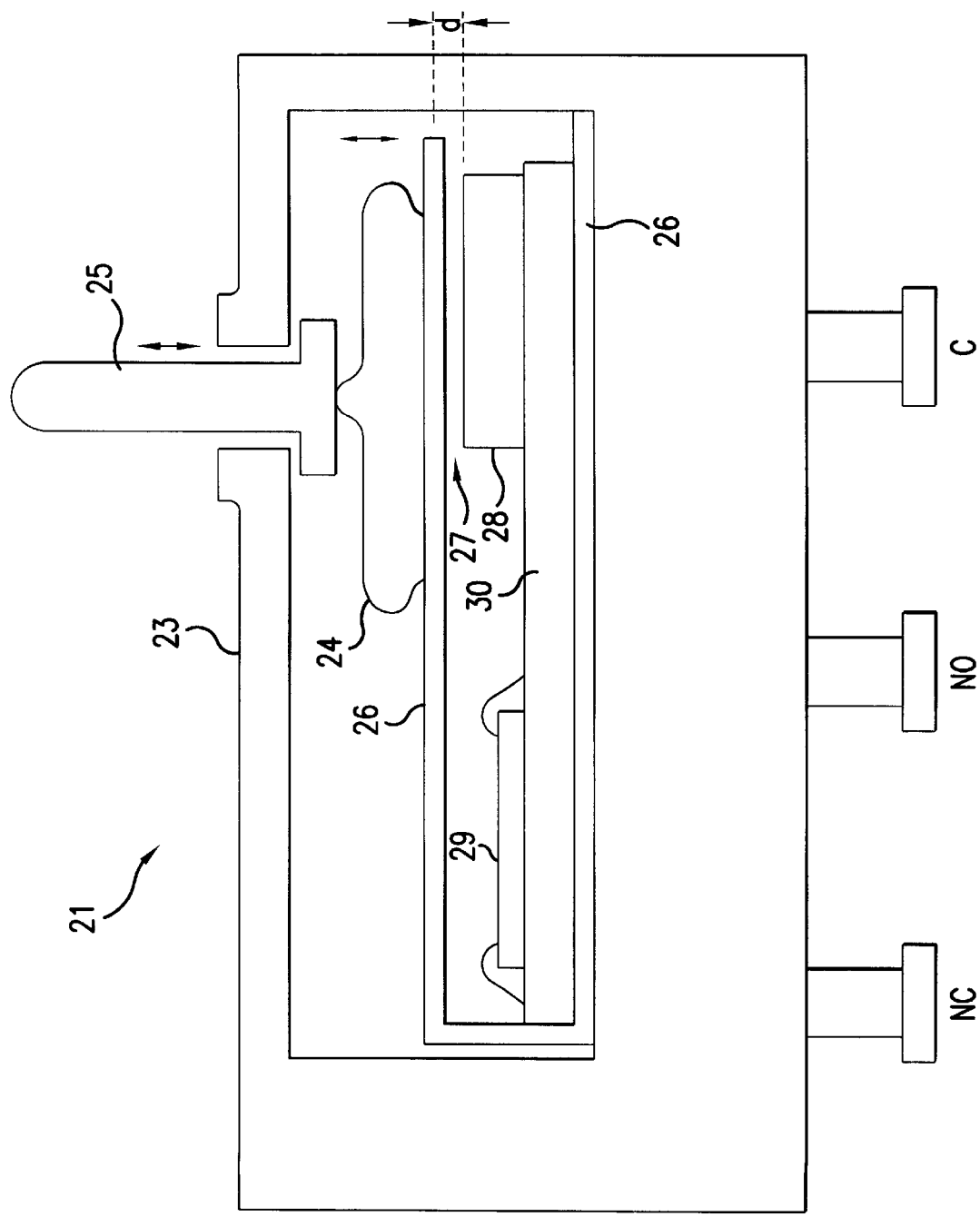
FIG. 1 is a structural view of a switch assembly with a plunger and terminals.

As seen in FIG. 1, a mechanically actuated, power stealing, low energy, solid state switch 21 is generally comprised of a housing 23, a plunger 25 for manual activation, a variable capacitor 27 in contact with plunger 25, an application specific integrated circuit (ASIC) 29 containing the solid state electronics, and suitable terminals for connection of the switch. The terminals include a normally closed terminal (NC), a normally open terminal (NO) and a common terminal (C). Variable capacitor 27 comprises plates 26 and 28 with a Mylar membrane 24 serving as the spring member interfacing between the plunger and variable capacitor 27. Plate or sensitive node 28 is connected via printed wiring board (PWB) 30 to the input of a transimpedance amplifier in ASIC 29. Plate 26 surrounds and shields the sensitive plate 28. The capacitance of capacitor 27 is changed by varying a distance d between plates 26 and 28 via the manual movement or action of plunger 25. Capacitor 27 varies from about 2 pF to 6 pF the length of travel d of plate 26.

Figure 2:
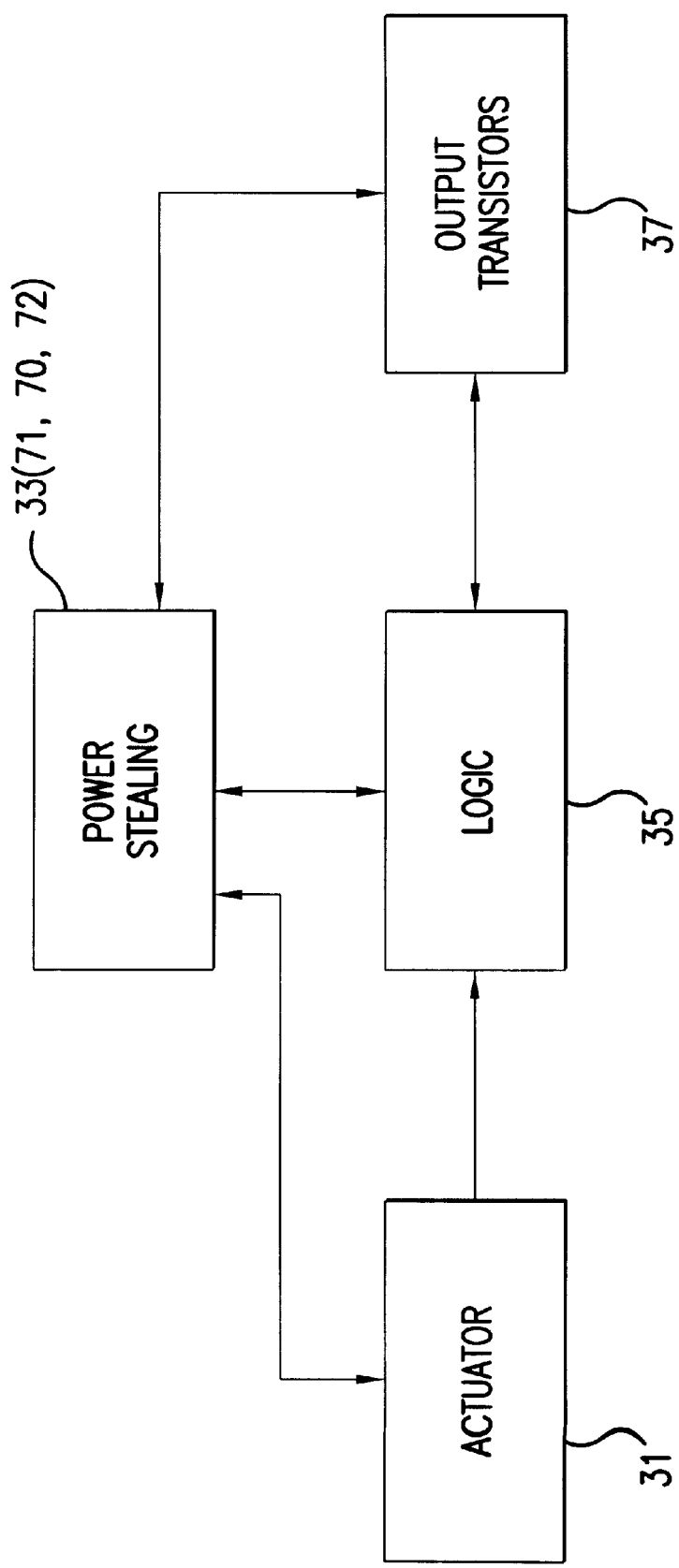
FIG. 2 is a block diagram of the major functional groupings of the switch.

ASIC 29 is built on a single bulk silicon CMOS substrate and contains, per the block diagram of FIG. 2, actuator electronics 31, power stealing circuits 33, switching logic 35 and output device 37 having transistors 49, 51, 53, 55 and 57, as shown in subsequent figures. The transistors are FETs. The output transistors together form an output buffer or the actual (solid state) switch 37 portion of the power stealing configuration 21.

Figure 3:
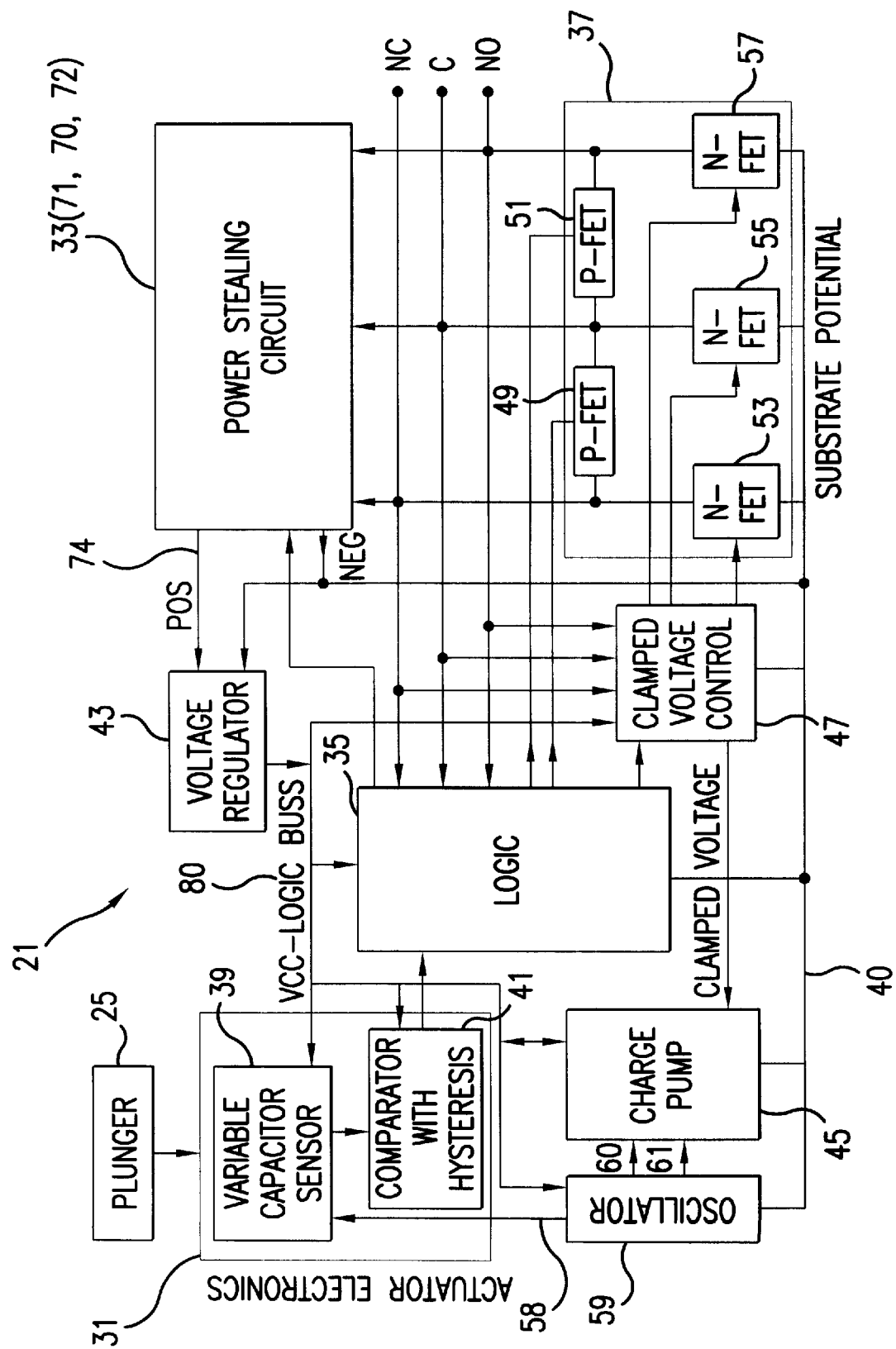
FIG. 3 is a detailed block diagram of a switch.

As seen in the more detailed block diagram of FIG. 3, actuator electronics 31 are comprised of a variable capacitor sensor 39 and a comparator amplifier 41 with a built-in hysteresis to make the solid state electronics behave more like and simulate a mechanical switch without the contact bounce.

Variable capacitor 27 is excited by an oscillator 59 via sensor electronics 39. Oscillator 59 is a 10 kHz to 100 kHz micropower design with 3 outputs. An output 58 drives variable capacitor sensor 39 while the other two outputs are a two phase, non-overlapping clocks 60 and 61, which feed charge pump 45. Oscillator 59 details are in FIG. 12. A power stealing FET network 33 (i.e., circuit 71, 70, or 72 of FIG. 5, 6, or 7, respectively), a voltage regulator 43, a charge pump 45, and a clamped voltage control 47 comprise the rest of switch 21.

Charge pump 45 design has a particular integration with the surrounding circuitry. Charge pump 45 has an input of 0.5 volt and an output of 2.5 volts or greater. A typical charge pump would not work with a 0.5 volt input because this voltage is below the FET gate threshold voltage and therefore is too low for oscillator 59 and control logic 35 to operate. In the present design, this problem is resolved in the startup logic. During initial power application to switch 21, all output FETs 49, 51, 53, 55 and 57 remain OFF until voltage regulator 43 and oscillator 59 reach operating voltage. This time is less than one millisecond (ms). Once switch 21 is powered, it can be turned ON and OFF at the maximum switching speed and remain ON with a clamped voltage of 0.5 volt, indefinitely.

Switching logic 35 includes the startup routine, "break-before-make" timing, polarity sensing, and logic to determine if switch 21 is connected in a SPST or SPDT configuration with two or three wires, respectively. The break-before-make timing is intended to make switch 21 behave like a mechanically equivalent switch. The break-before-make time is increased automatically in the case of heavy capacitive loads to ensure that the SPDT switch does not lose power during the switching transition.

The SPST or SPDT configuration is determined by monitoring terminals NC, C, and NO (high voltage inputs 0 to 30 volts). If switch 21 is to be operating in the two- or three-wire mode, then it can also be determined by monitoring the output voltage of voltage regulator 43. If the voltage regulator voltage starts to fall, this indicates two-wire (SPDT) operation and the output FETs can not be fully turned ON.

Output device 37 includes two P-FETs 49 and 51 and three N-FETs 53, 55, 57 serving to change switch 21 from a high impedance OFF state to a low impedance ON state or vice versa. In the three-wire (SPDT) configuration one P-FET or two N-FETs are turned fully ON by logic 35 depending on the position of the plunger and the voltage polarities on terminals NC, C, and NO.

Figure 10A:
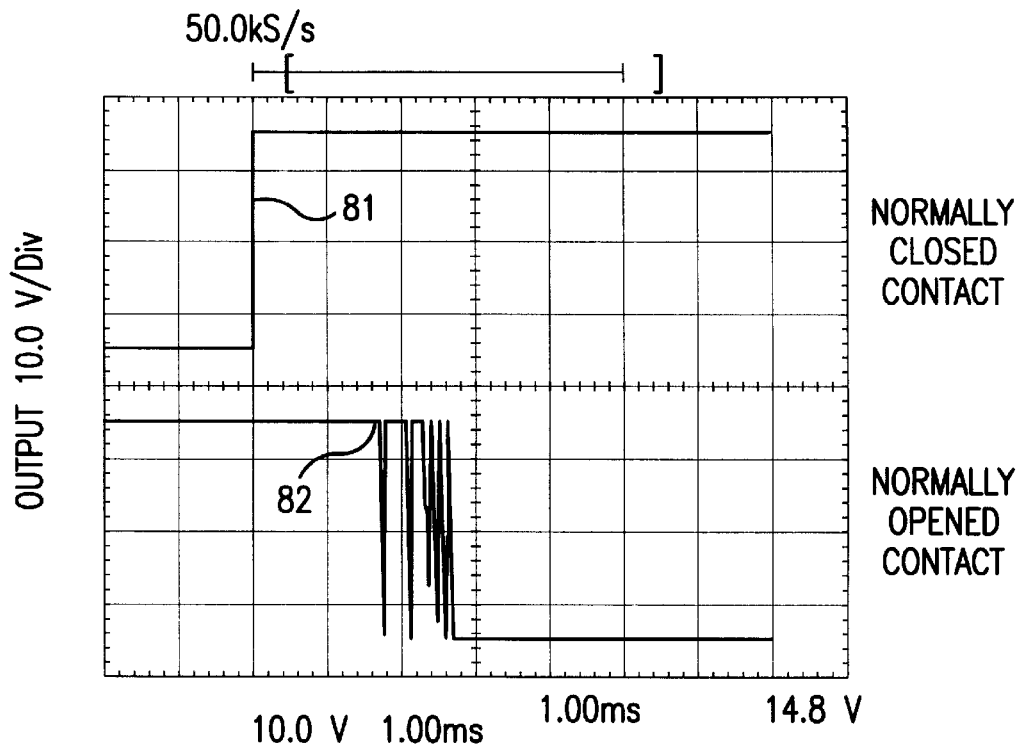
FIGS. 10a and 10b are graphs showing performance characteristics of mechanical and solid state switches, respectively.
Figure 10B:
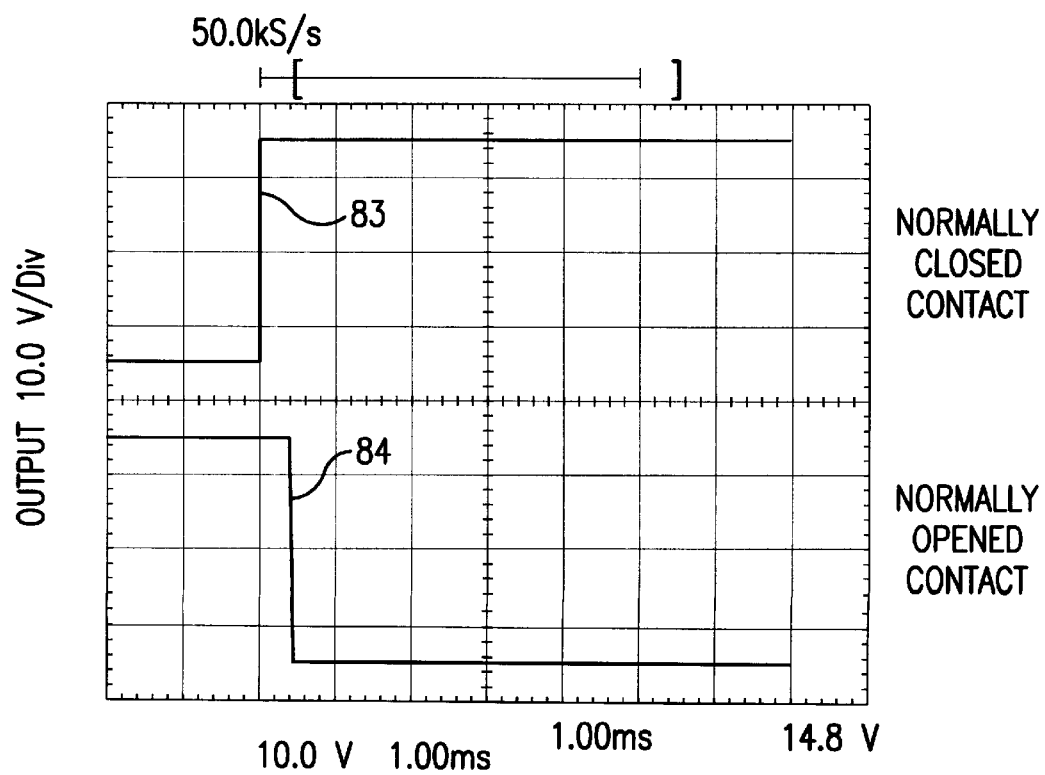

Circuit 37 simulates the connection and disconnection of contacts of a mechanical switch. In FIG. 10*a*, curves 81 and 82 show the opening of a normally closed contact and the closing of a normally open contact, respectively, of a mechanical switch that is equivalent to solid state switch 21. Curve 82 shows the bounce of the closing contact. In FIG. 10*b*, curves 83 and 84 show the opening of a normally closed contact and the closing of a normally open contact, respectively, of solid state switch 21. Curve 84 reveals no bounce and is much faster, if desired as such, than the corresponding contact of the mechanical switch.

In the two-wire (SPST) configuration, P-FETs 49 and 51 are not used and remain OFF. Only two of the three N-FETs 53, 55 and 57 are used in the two-wire configuration. One of the N-FETs operates in the reverse mode and is turned on fully while the other N-FET is clamped at 0.5 volt. The N-FETs are controlled by logic 35 depending on the position of plunger 25, the voltage on terminals NC, C, and NO, and the state of clamped voltage control 47. Protection is provided for terminals NC, C, and NO, including short circuit, over voltage, and electrostatic discharge (ESD) protection.

Figure 4:
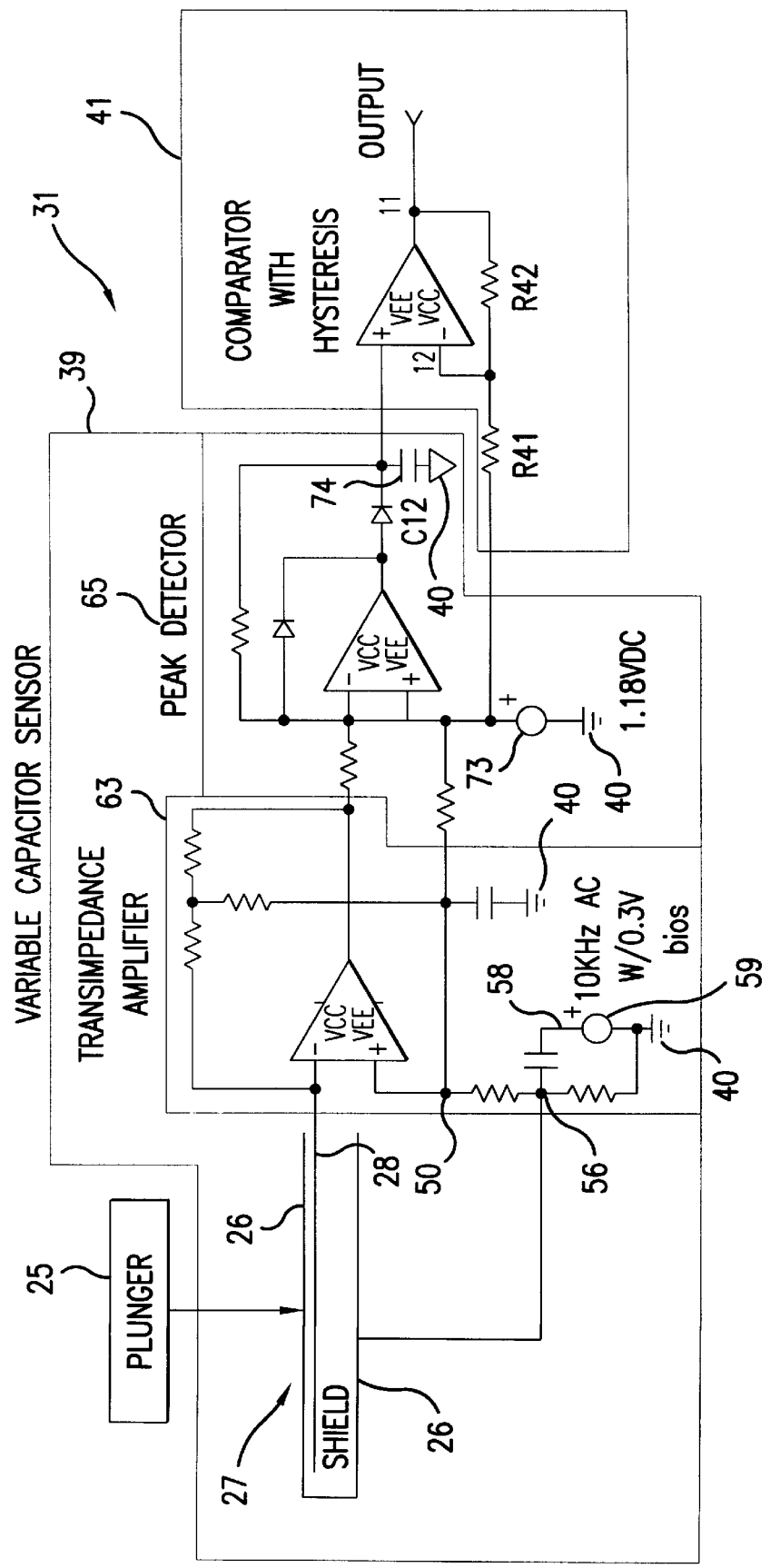
FIG. 4 is a schematic of the plunger position sensor electronics.

Referencing FIG. 4, the activation of plunger 25 decreases the distance between variable capacitor plates 26 and 28. Capacitor plate or sensitive node 28 is connected to the input of transimpedance amplifier 63. An output 58 of a portion oscillator (10 KHz) 59 is AC coupled to node 56 with a DC bias of 0.3 volt while node 50 is biased at 0.6 volt. This allows capacitor plates 26 and 28 to make contact without circuit endangerment, i.e., an infinite capacitance case, and still provide proper switch operation. The non-inverting input of peak detector 65 has a band gap generator 73 of about 1.18 volts DC bias applied to it. The AC output of transimpedance amplifier 63 is then fed to peak detector 65 for positive peak detection and integration by capacitor 74. The DC output of peak detector 65 is then fed to the input of comparator 41 with hysteresis. The electronic hysteresis is set, by the ratio of resistors R42 to R41, to be equivalent to a mechanical differential travel of 0.002 inch of plunger 25. The output of the comparator 41 provides the equivalent of a mechanical switch with hysteresis, but without the contact bounce.

Figure 5:
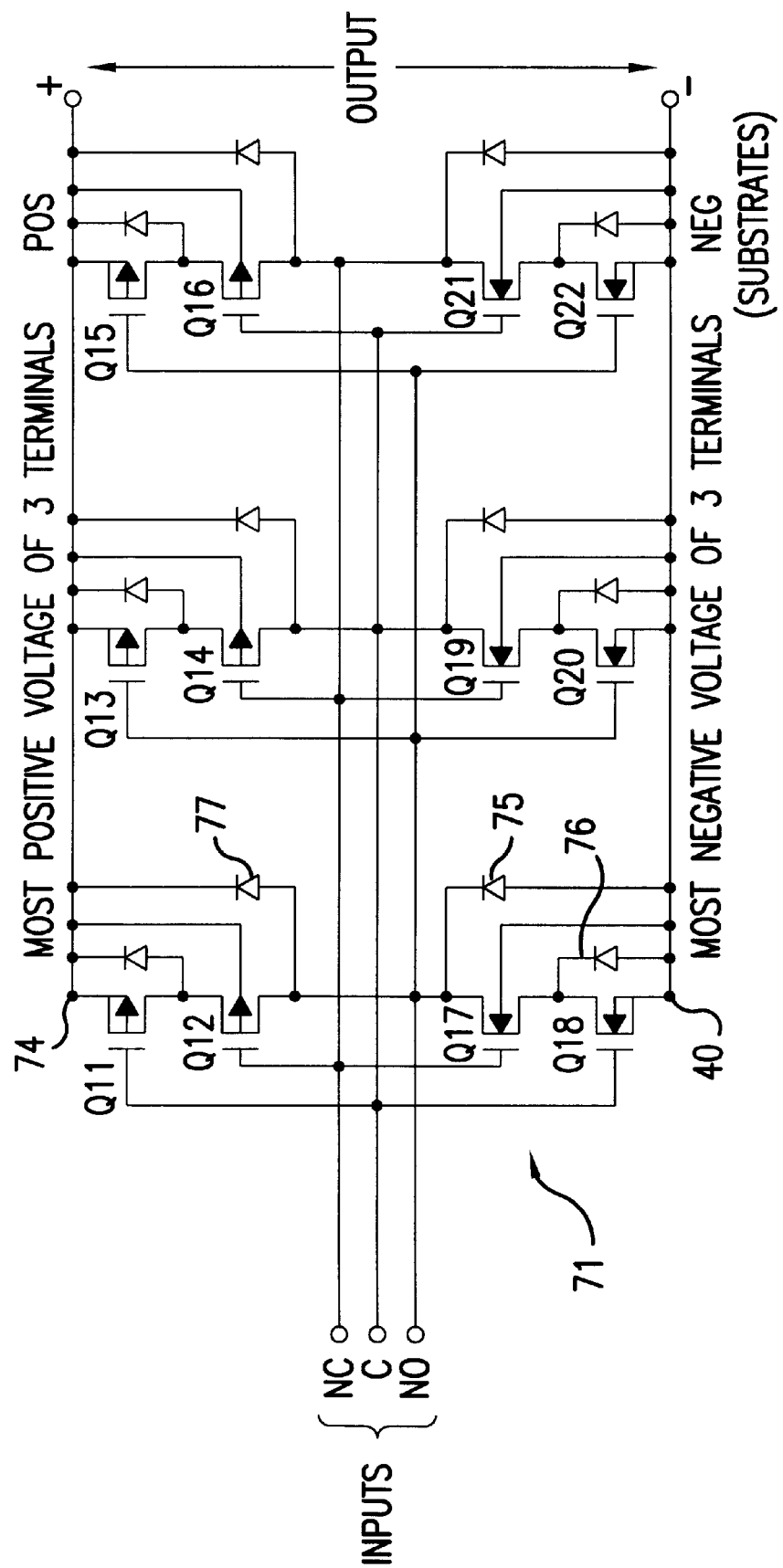
FIG. 5 is a schematic of the low diode drop, three-terminal FET network for power stealing, which can operate down to at least three volts

Power stealing FET network 71 circuit of FIG. 5 is used for the rectification and voltage assignment of the most negative terminal voltage to the CMOS substrate. The most positive terminal voltage is assigned to voltage regulator 43 that supplies power to internal logic 35 and other circuitry 31, 45, 47 and 59 for the operation of solid state switch 21.

By operating some FETs of network 71 in reverse mode, very little power is consumed making the present device suitable as a low-power switching device. By this reverse mode operation, power is stolen from the controlled or attached device with little or no diode voltage drop. Network 71 of FIG. 5 has one diode drop in a worst case condition and allows operation of the switch down to 3.0 volts.

Reference is made to FIG. 5 for an illustration of reverse-mode FET operation. For N-channel FETs Q17–Q22 operating in the normal mode, electrons, i.e., majority carriers in the FET channel, flow from the FET source to the FET drain and the body diode is reversed biased. The drain voltage is positive relative to the source voltage for normal FET operation. In the reverse mode, the electrons flow in the opposite direction. That is, the source and drain of the FET change roles and the body diode becomes forward biased. However, the FET channel can still be turned ON if the gate potential is more positive than the threshold voltage referred to in the newly defined source (previous drain). Therefore, the new drain to source voltage can be reduced from the body diode drop to no diode drop.

For P-channel FETs Q11–Q16 operating in the normal mode, holes, i.e., majority carriers in the FET channel, flow from the FET source to the FET drain and the body diode, e.g., 77, is reversed biased. The drain voltage is negative relative to the source voltage for normal FET operation. In the reverse mode, the holes flow in the opposite direction. That is, the source and drain of the FET change roles and the body diode becomes forward biased. However, the FET channel can still be turned ON if the gate potential is more negative than the threshold voltage referred to in the newly defined source (previous drain). Therefore, the new source-to-drain voltage can be reduced from the body diode drop to no diode drop.

For example, if the NC and C terminals are at a greater potential than the NO terminal by the threshold of the FET, e.g., one volt, then current flows from the load at NEG 40 to NO terminal, to forward bias body diodes 75 and 76. However, NC and C terminals, being at greater potentials than the threshold gate voltages for Q17 and Q18, turns both of these FETs on even though they are conducting current in the reverse mode. Therefore, the NO terminal is connected the lowest voltage, i.e., the substrate voltage level 40, with no diode drops.

If the NC terminal and C terminal are at the same potential and at a greater potential than the NO terminal, of a typical switch, only P-FETs Q13 and Q15 operating in the reverse mode are turned ON. Transistors Q14 and Q16 remain OFF but their body diodes are forward biased.

In general, the network of six N-FETs and six P-FETs steals power from the three terminals, NC, C, NO, independent of their voltages and polarities and always provides a positive voltage at output terminal POS 74 and a negative voltage at output terminal NEG 40. The difference between terminals POS 74 and NEG 40 is then one diode drop less than the difference between the most positive and the most negative of input terminals NC, C, and NO. However, this is better than a full wave bridge that has two diode drops. The circuit of FIG. 5 provides power at all times and requires no additional control logic or timing considerations.

It will be appreciated that a simpler FET network construction could be utilized if the solid state switch were only to be a two-terminal SPST switch instead of the three-terminal SPDT of the previously described embodiment.

Figure 6:
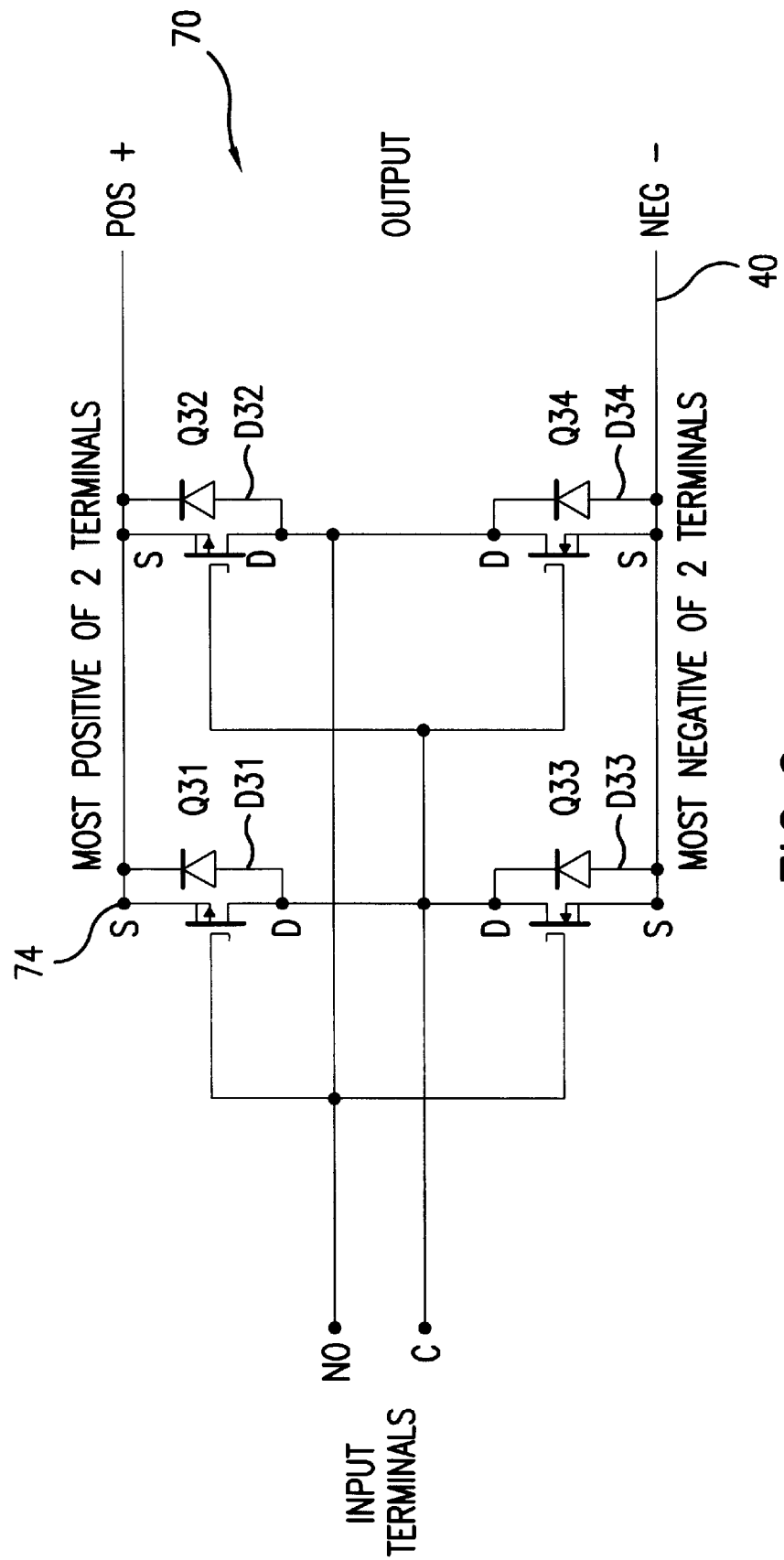
FIG. 6 is a schematic of a two-terminal, power stealing network for operation down to 1.5 volts.

FIG. 6 shows a two-terminal power stealing circuit 70 consisting of two P-FETS, Q31 and Q32, and two N-FETs, Q33 and Q34. If terminals NO and C of a SPST switch are used as inputs to power stealing circuit 70, there is no loss of power or diode drops at output terminals POS 74 and NEG 40. This circuit can operate down to 1.5 VDC. If NO terminal is more positive than C terminal by the threshold gate voltage, then Q32 and Q33 operating in the reverse mode will turned ON while Q31 and Q34 operating in the normal mode will be turned OFF. Body diodes D31 and D34 are reversed biased. Body diodes D32 and D33 are effectively shorted by ON transistors Q32 and Q33, respectively, resulting in no diode drops for power stealing circuit 70.

Figure 7:
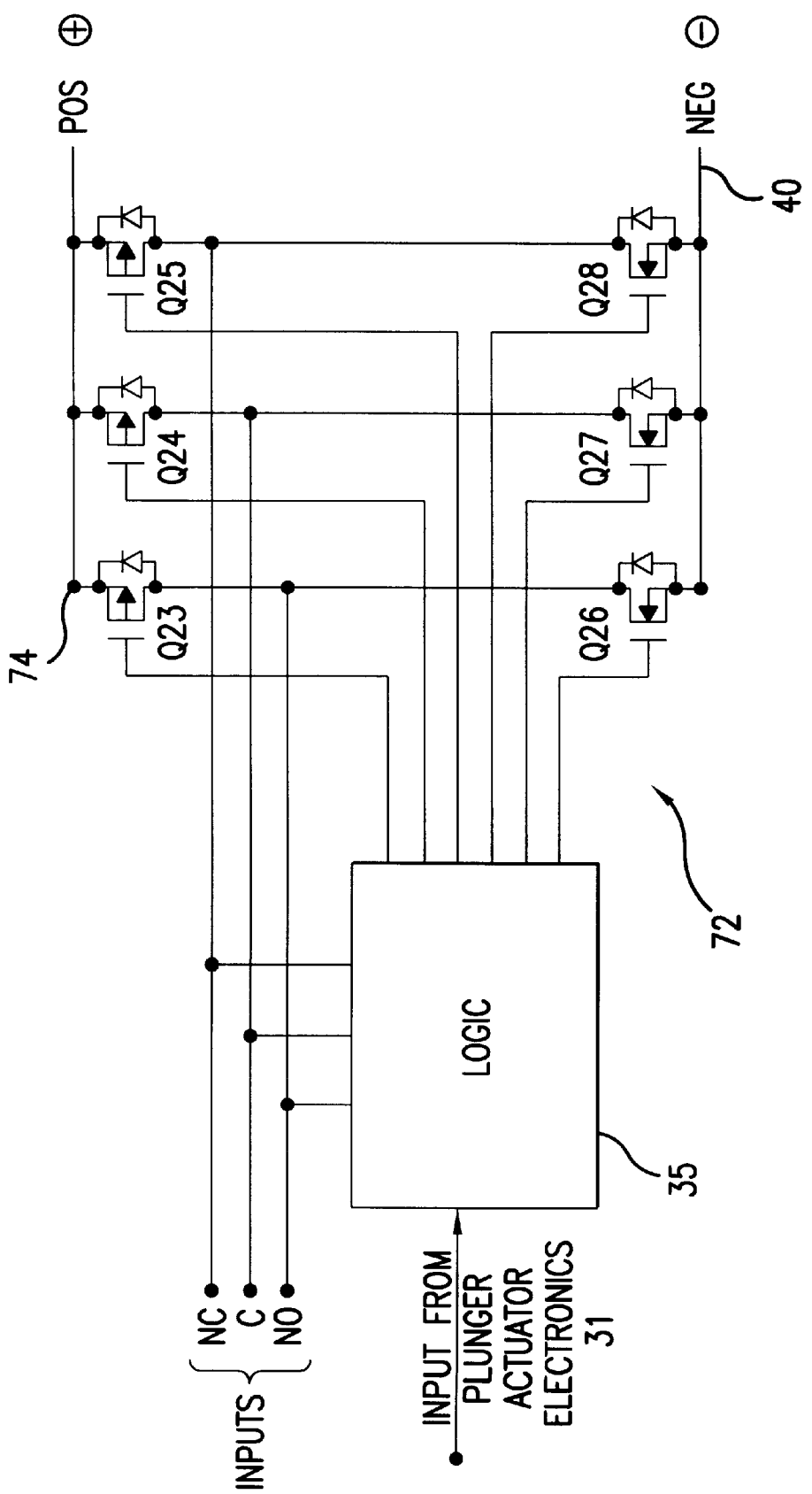
FIG. 7 is a schematic of a three-terminal, power stealing network for operation down to 1.5 volts.

If the input terminal polarities are reversed, the output polarity remains unchanged. In a similar fashion, diagonally opposite FETs Q31 and Q34 are turned ON, and Q32 and Q33 are turned OFF. This circuit 70 has applications for any battery operated device because it is insensitive to voltage polarity. Batteries can be installed in either direction or polarity without damaging electronic equipment FIG. 7 is an alternate power stealing circuit 72 that has no diode drops and allows operation down to 1.5 volts. This approach requires more complex logic and depends on logic timing and the state of switch 21. The SPDT switch in the OFF or ON state with three terminals is essentially degenerated to a two-terminal circuit similar to that of FIG. 6 with two N-FETs and two P-FETs which have no diode drops. For example, this is the case when the switch's OFF terminals (NC and C) are effectively one terminal while NO is the second terminal, and when the switch's ON terminals (NO and C) are effectively one terminal while NC is the second terminal.

Power stealing logic contained in logic circuit 35 is designed to handle input voltages from 0 to 30 volts. The output voltage control for N-FETs Q26, Q27, and Q28 are allowed to swing from the NEG 40 rail to a positive voltage not to exceed the maximum gate voltage.

The output voltage control for P-FETs Q23, Q24, and Q25 are allowed to swing from the POS 74 rail to a lower voltage not to exceed the maximum gate voltage. Logic 35 would turn ON one of P-FETs, Q23, Q24, or Q25, and one of N-FETs, Q26, Q27, or Q28, resulting in no diode drops.

Logic 35 uses inputs from the input plunger actuator electronics 31 and monitors the voltages on NC, C and NO to determine the proper timing between the transition time from the OFF to ON or ON to OFF states such that switch 21 does not lose power during the transition.

The power stealing circuit 72 in FIG. 7 allows for SPDT (three wire) operation down to 1.5 volts but requires more complex logic and proper timing during the transition time, particularly with large capacitive loads. With large capacitive loads, the break-before-make time is increased such that the power stealing circuit does not lose power during the transition from ON to OFF or OFF to ON.

Figure 8:
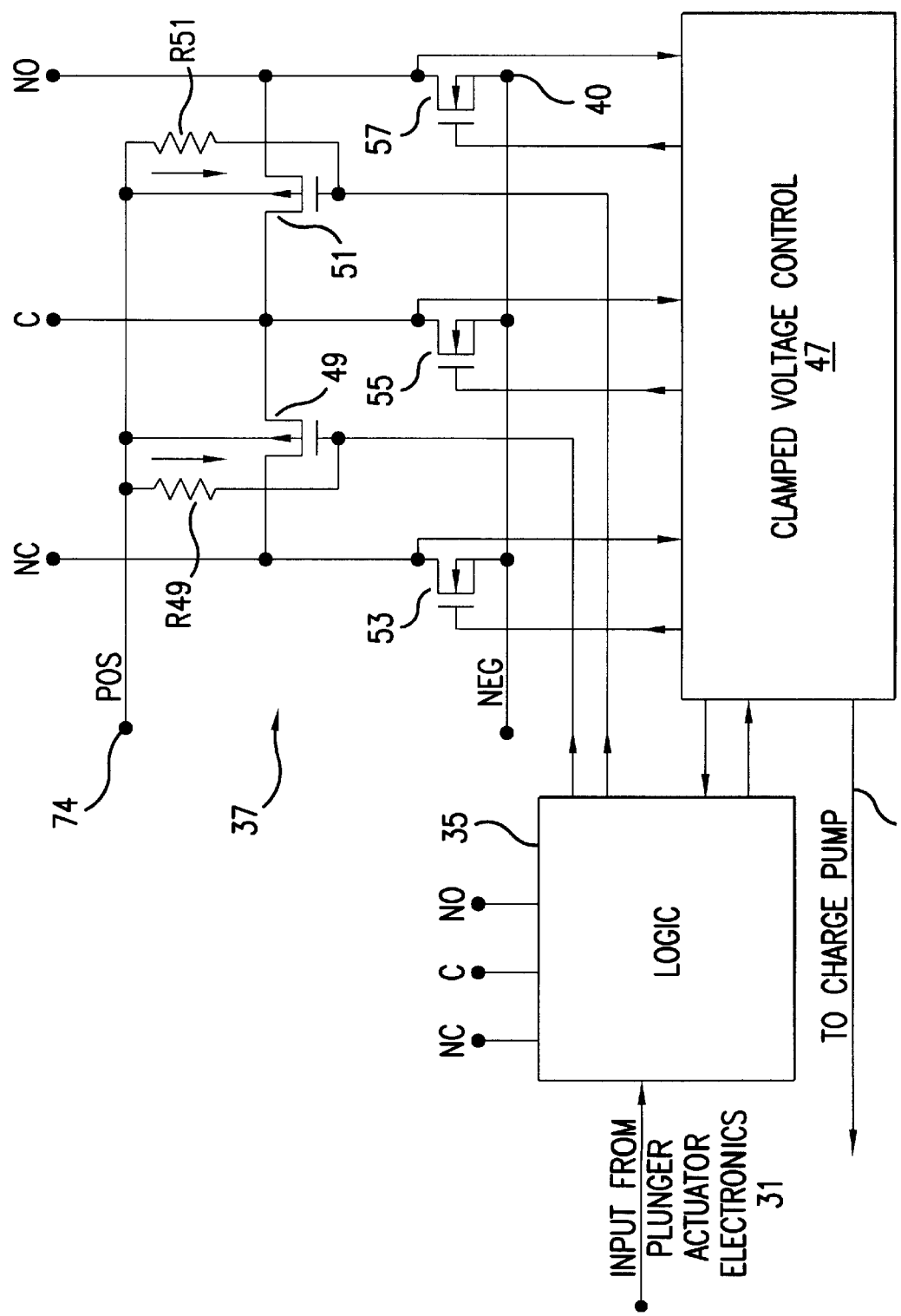
FIG. 8 is a schematic of the output FET control circuit.

FIG. 8 is the control circuit for output FETs 37. P-FETs 49 and 51 are controlled directly from logic 35. The gates of N-FETs 53, 55, 57 are controlled by clamped voltage control 47. The drains of the N-FETs are used as inputs to the clamped voltage control 47. In the clamped mode, the drains of the N-FETs are held at 0.5 volts independent of the external load current. The clamped 0.5 volts appears as a logic low level for digital circuits.

Figure 9:
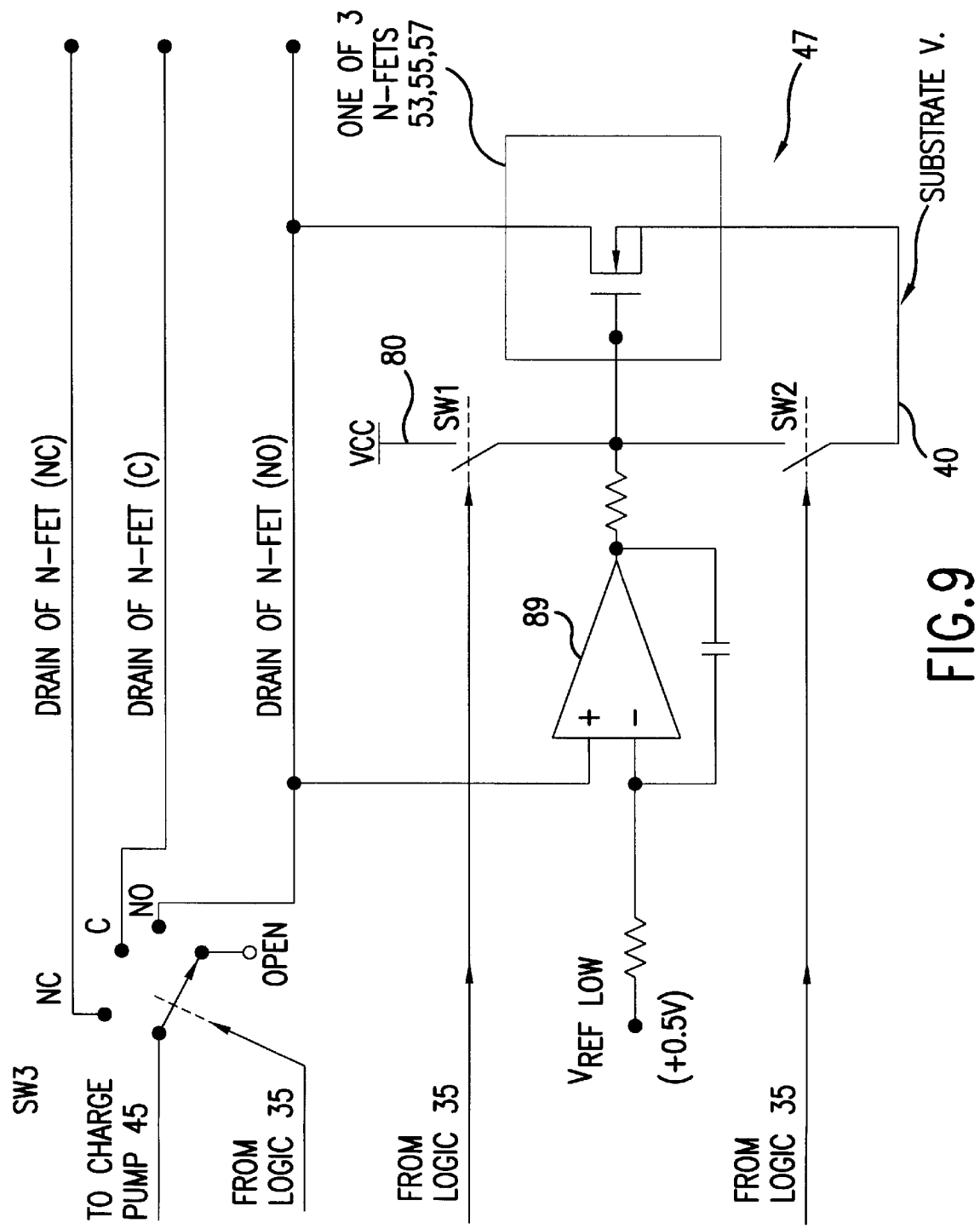
FIG. 9 is a schematic of the clamped voltage control circuit.

Clamped voltage control 47 is shown in FIG. 9. The circuit is shown for one of the three N-FETs 53, 55, 57. Each N-FET can have three states: 1) OFF, SW2 closed; 2) clamped at 0.5 volt, SW1 and SW2 opened; and 3) ON, SW1 closed.

In the two-wire configuration, one of the N-FETs is clamped to 0.5 volt as determined by logic 35. The amplifier 89 using a 0.5 volt reference, controls the N-FET in a closed loop. The N-FET serves as one inversion around the closed loop. Hence the 0.5 reference is fed to the inverting input to amplifier 89. The clamped voltage is then directed by SW3 to charge pump 45 where it is multiplied up to power supply voltage (VCC)-logic buss 80.

On initial startup, switch SW2 remains closed until voltage regulator 43 receives sufficient power to start oscillator 59, which takes approximately one millisecond to power charge pump 45 to full operational voltage. VCC logic buss 80 of FIG. 3 is powered from voltage regulator 43 or charge pump 45 but not by both at the same time. During startup, VCC logic buss 80 is powered from regulator 43. If the switch is turned ON, VCC logic buss 80 is powered from charge pump 45.

Figure 11:
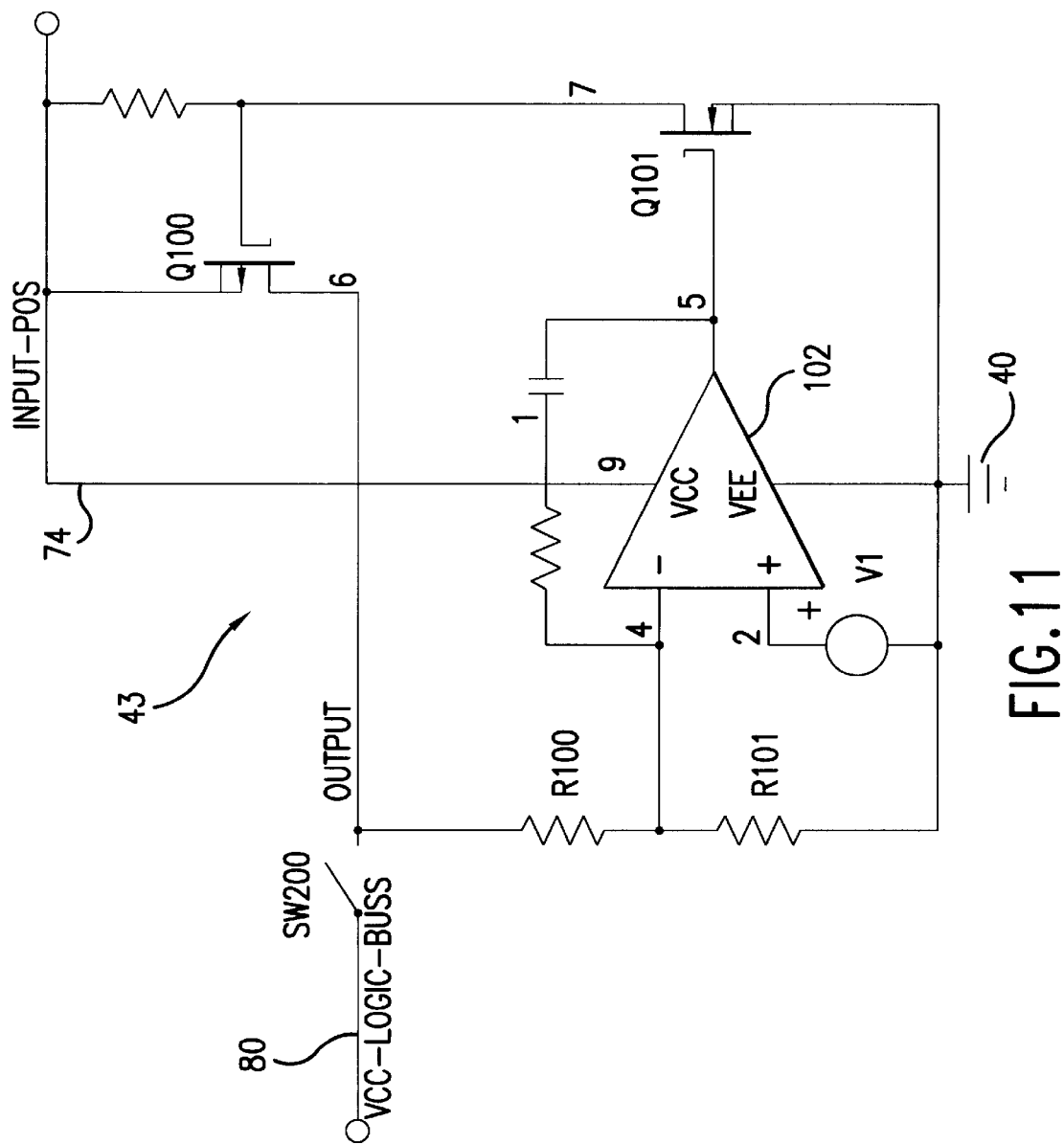
FIG. 11 is schematic of a voltage regulator.

The voltage regulator 43 of FIG. 11 receives its input from POS 74, which is the most positive voltage from power stealing circuit 33. P-channel FET Q100 allows voltage regulator 43 to operate with a minimum voltage difference (i.e., less than 0.1 volt) between the input and output voltages. The maximum input voltage is 30 volts or the maximum voltage defined by the integrated circuit (IC) process. The output of voltage regulator 43 is set by the ratio of resistor R100 and resistor R101 relative to a band gap voltage generator V1. A micro-powered operational amplifier 102 needs to be powered from the high voltage input-POS 74 and not from the regulated output for the circuit to startup properly. Switch SW200 is associated with switch SW201 of charge pump 45. Switch SW200 is closed in order to power VCC-logic buss 80 from voltage regulator 43 while switch SW201 is closed to power VCC-logic buss 80 from charge pump 45. If solid state switch 21 is to operate at minimum power, switch SW200 and switch SW201 should never be closed at the same time.

Figure 12:
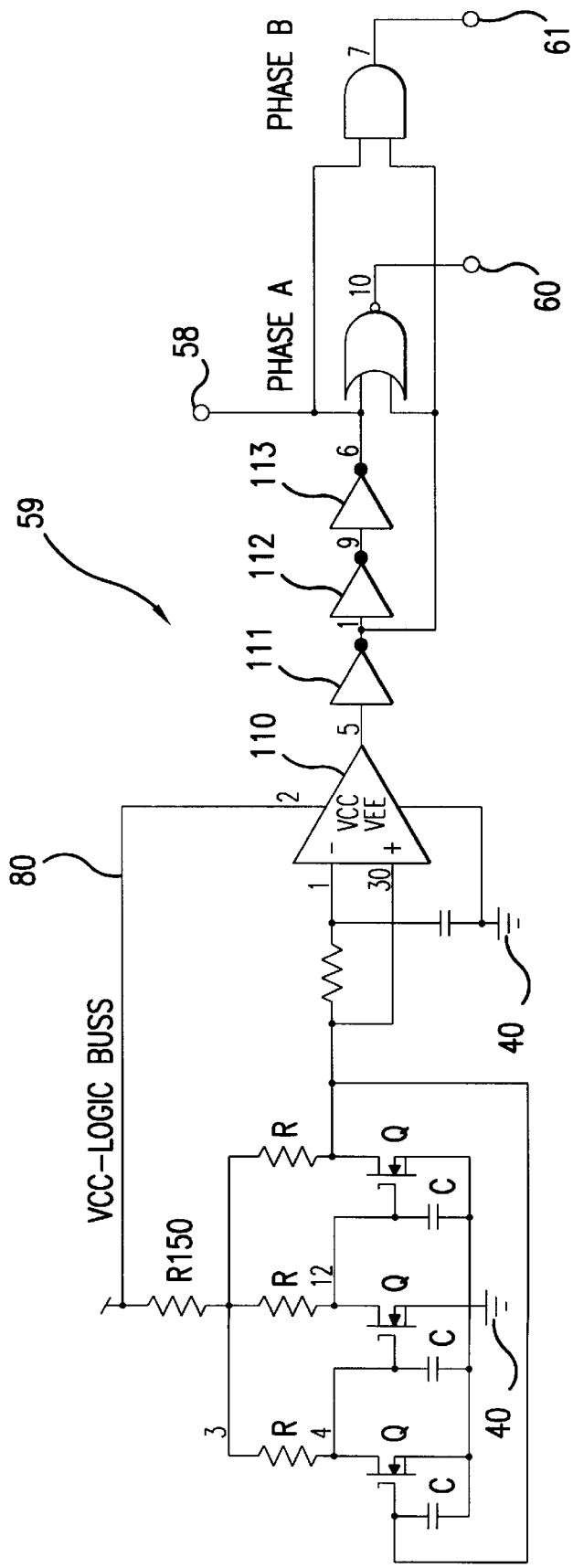
FIG. 12 reveals a two-phase oscillator.

Clock oscillator 59 with two non-overlapping clock phases A and B is shown in FIG. 12. Oscillator 59 is micro-powered in that it does not use CMOS complementary P-channel and N-channel devices operating in the linear region that consume a great deal of power. Oscillator 59 is a phase shift oscillator consisting of three N-channel FETs Q. The resistor R and capacitor C values are set to give 60 degrees phase shift per stage or 180 degrees total for the three stages. A current source or resistor R150 is used to supply current to three FETs Q. Item 110 is a high input impedance amplifier rather than a comparator that consumes more power operating in the linear region. Inverter 111 is used to speedup the edge rates while inverter 112 and inverter 113 are used for delay to create the non-overlapping clock phases A and B at outputs 60 and 61, respectively. Clock phases A and B are used as inputs to charge pump 45. Output 58 is input to variable capacitor sensor 39. All of circuit 59 takes less than 3 microamperes to operate.

Figure 13:
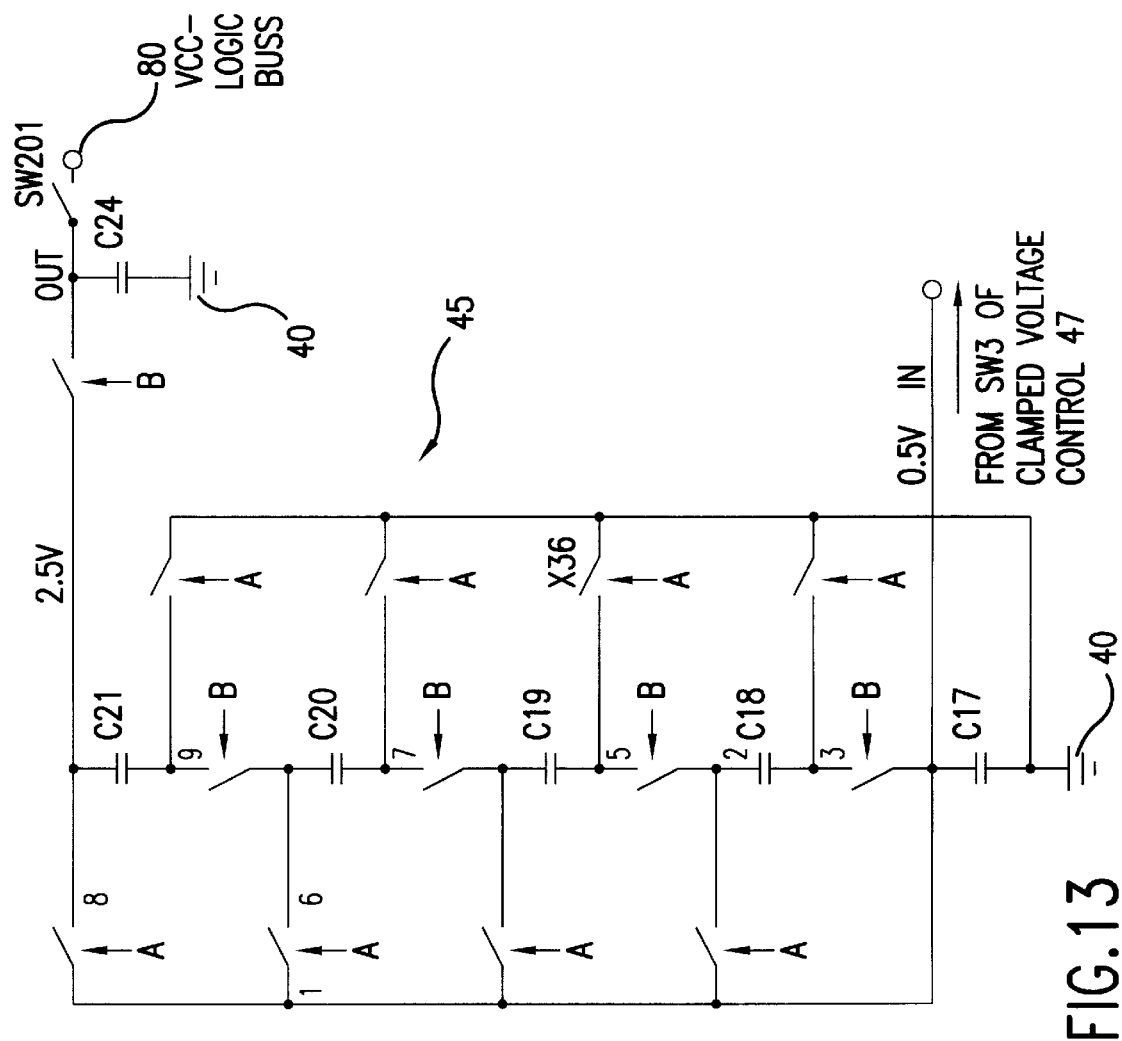
FIG. 13 shows a circuit diagram of a five-times charge pump.

A five-times charge pump 45 is shown in FIG. 13. The input to charge pump 45 is obtained from clamped voltage control 47. In this embodiment, the clamped voltage control 47 input is 0.5 volt. During clock phase A, all five capacitors are connected in parallel and charged to 0.5 volts. During clock phase B, all of five capacitors C17–C21 are connected in series resulting in a 2.5 volt output. Non-overlapping clock phases A and B are used to ensure that no switches A are not closed at the same time as switches B, and vice versa.

Switch SW201 is used to power VCC-logic buss 80 from charge pump 45. Switch SW201 is closed only when solid state switch 21 is in the two wire mode and the associated two terminals NC and C, or NO and C, are conducting. Otherwise, the associated switch SW200 of voltage regulator 43 is closed and VCC-logic buss 80 is powered from voltage regulator 43. If the logic and all of the analog circuits of device 21 are designed to operate on 1.5 volts, then a three-times charge pump can be used to pump the 0.5 volt input to a 1.5 volt output for VCC-logic buss 80.

FIG. 14 is the truth table for logic 35. Inputs to the logic 35 are noted in the following description. The three terminals of switch 21; normally closed (NC), common (C), and normally open (NO); are used as inputs to logic 35. The voltages on these terminals range from 0 to +30 volts (or the maximum voltage for the IC process) relative to the substrate, which is automatically tied to the lowest potential. These high voltages are converted to logic low voltages with a threshold voltage set at 0.25 volt or one-half of the clamped voltage 0.5 volt. Therefore, there are terminal voltage ($V_T$) high and low logic levels. Logic low $L_T$ is when $V_T$<0.25 volt, and logic high $H_T$ is when $V_T$= or >0.25 volt.

The plunger 25 position is a low voltage input from the variable capacitor sensor 35. "Out" means that plunger 25 is extended. "In" means that plunger 25 is depressed. The voltage from VCC-logic buss 80 is monitored as an input $V_M$ to logic 35. If the voltage falls below the regulated voltage from voltage regulator 43, this indicates that switch 21 is operating in the two-wire mode and charge pump 45 needs to charge VCC-logic buss 80. If the regulated voltage is 2.5 volts plus or minus 0.05 volt and logic 35 and other circuits of switch 21 operate for voltage tolerances of 2.5 volts plus or minus 0.2 volt. Then the VCC-voltage buss 80 monitor $V_M$ threshold is set for 2.4 volts.

Logic low $L_M$ is when $V_M$<2.4 volts and logic high $H_M$ is when $V_M$= or >2.4 volts. If $V_M$>2.4 volts, then VCC-logic buss 80 is powered from voltage regulator 43. If $V_M$<2.4 volts, then VCC-logic buss 80 is powered from charge pump 45.

The outputs from logic 35 are noted in the following description. P-FET 49 is associated with the NC and C terminals. P-FET 51 is associated with the NO and C terminals. Each of these P-FETs 49 and 51 has a resistor, R49 and R51, respectively, between the gate and source, in FIG. 8, to pull the gate high and turn the P-FETs OFF.

Logic low level $L_P$ means that logic 35 sinks a current greater than the P-FET gate threshold voltage divided by the gate resistor (R49 or R51) and pulls the gate low to turn the P-FET ON. The gate voltages are limited by the maximum value of the current sink so as not to exceed the maximum P-FET gate voltage. Logic high level $H_P$ means that logic 35 does not sink current and the P-FET gate goes high turning the P-FET OFF.

N-FETs 53, 55 and 57 are controlled by clamped voltage control 47. There are switches SW1 and SW2 associated with each of the three N-FETs, 53, 55 and 57, as shown in FIG. 9. Each N-FET has three possible states: 1) OFF when switch SW1 is open (Open) and switch SW2 is closed (Clsd); 2) clamped (0.5 volt) when switch SW1 is open and switch SW2 is open; and 3) ON when switch SW1 is closed and switch SW2 is open. Switches SW1 and SW2 are low voltage analog switches.

Switch SW3 is represented by an analog switch having four positions of NC, C, NO and open. Switch SW3 is implemented in silicon as three high voltage FETs. The open position means all three FETs are open.

The comments portion of FIG. 14 is split into three columns. The first shows the number of wires connected to the switch (i.e., two or three). The second indicates current direction. "+" means that the current flows into the terminal; "−" means that the current flows out of the terminal; and "0" indicates an unused terminal and no current flow. The third column indicates combination, which refers to a particular current flow configuration for the switch terminals.

In the three-wire mode there are six combinations of current directions. Current can flow in or out of each terminal. This gives eight combinations or two cubed. Since current can not flow in or out of all three terminals at the same time, this leaves six combinations for the three-wire mode.

In the two-wire mode, there are two combinations for current direction if the NO and C terminals are used. The NC terminal is unused. In the two-wire mode there are two combinations for current direction if the NC and C terminals are used. The NO terminal is unused. Two wires connected to the NC and NO terminals serve no useful function since this connection is always open. Thus, in total, there are ten combinations of current directions associated with the three terminals (i.e., six combinations for three wires and four combinations for two wires.

In FIG. 14, the notation "X" means "do not care" or "unused terminal." The unused terminals are not allowed to float and possibly pickup noise. They are tied to substrate potential 40 or to the common terminal by logic 35.

There are 16 rows in the logic table if one includes the plunger position. Some of the rows are repeated indicating that the same logic applies to more than one current flow configuration. The logic states shown in the truth table of FIG. 14 are the steady state values for the inputs and outputs. One may ask how can the input terminals NC, C, and NO be used to control the same terminals as outputs. The logic timing takes advantage of the break before make feature used to mimic the equivalent mechanical switch.

Figure 15:
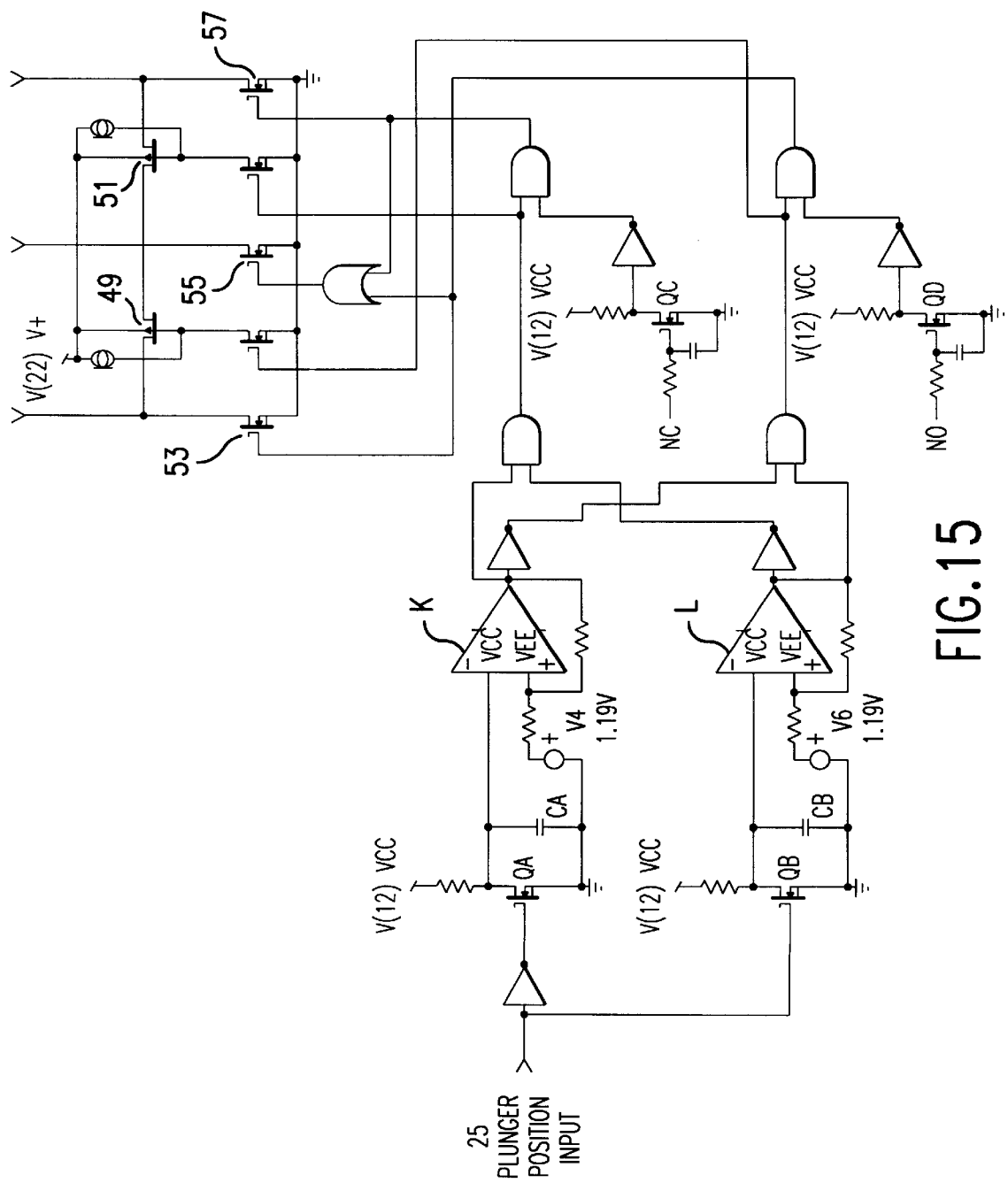
FIG. 15 is a simplified logic schematic for the single pole double throw switch.

A simplified logic diagram for the SPDT six combinations is shown in FIG. 15. The plunger 25 position input from the actuator electronics 31 is used as input to the logic. The input signal is inverted; plunger OUT is a high logic level while plunger IN is a low logic level. Input FETs QA and QB have a fast turn on and a slow turn off time due to the charging time of capacitors CA and CB, thus creating the electronic break before make timing.

Comparators K and L with hysteresis are used to give a clean and fast edge to the following digital logic. Additional logic is added to ensure that the normally closed and normally open contacts can never be closed at the same time, in similar fashion to the mechanical switch. In the simplified logic diagram, inputs NC and NO are shown as direct inputs to the gates of QC and QD. These inputs are high voltage inputs requiring ESD protection and level shifting with threshold detection. Note that common terminal C is not required as an input to this logic implementation. The logic state of terminals C is automatically determined from the power stealing circuit in conjunction with input plunger position. That is, the power stealing circuit automatically ties the terminal with the lowest logic level to the substrate. The output FETs 49, 51, 53, 55, and 57 are the same FETs referred to elsewhere in this document.

The basic idea of the invention is not limited to a mechanical plunger 25 input. The same circuits of switch 21 apply if one replaces capacitor 27 of variable capacitor sensor 39 in the front end with a capacitive proximity sensor. Other front-end sensors may include other kinds of sensors such as inductive, magnetic, magnetoresistive (MR), pressure, optical, temperature, stress, strain, and resonant integrated micro structures (RIMS).

It will be remembered that, in any of the preferred embodiments, the terminals are not dedicated and may be connected randomly. The switch will operate in any configuration.

From the foregoing, the ordinarily skilled artisan will apprehend a low power, solid state, universally connectable, energy stealing switch ideally suited as a drop-in replacement for low energy mechanical switches. While the present invention has been shown and described with reference to certain embodiments, other embodiments of the invention will become apparent to the ordinarily skilled artisan upon disclosure of the present invention.

What is claimed is:

1. A solid state switch comprising:
   a variable capacitor sensor;
   a comparator, having hysteresis, coupled to said variable capacitor sensor;
   a logic circuit in electrical communication with said comparator;
   a power stealing circuit in electrical communication with said logic circuit; and
   an output control circuit in electrical communication with said logic circuit and said power stealing circuit.

2. The switch of claim 1, further comprising:
   a common terminal in electrical communication with said output control circuit;
   a normally closed terminal in electrical communication with said output control circuit; and
   a normally opened terminal in electrical communication with said output control circuit.

3. The switch of claim 2, further comprising:
   a clamped voltage control circuit in electrical communication with said output control circuit;
   a voltage logic buss in electrical communication with said variable capacitor sensor, said comparator, said logic circuit, said power stealing circuit and said output control circuit;
   a charge pump in electrical communication with said clamped voltage control circuit and to said voltage logic buss; and
   a voltage regulator in electrical communication with said voltage logic buss.

4. The switch of claim 3, wherein said power stealing circuit has less than two diode drops.

5. The switch of claim 3, wherein said charge pump operates on a very low voltage and outputs a much higher voltage sufficient to operate the solid state switch.

6. The switch of claim 5, wherein:
   said power stealing circuit seeks out a most negative terminal among the common terminal, the normally closed terminal and the normally open terminal; and
   said power stealing circuit seeks out a most positive terminal among the common terminal, the normally closed terminal and the normally open terminal.

7. The switch of claim 6, wherein the hysteresis of said comparator mimics a differential travel of a mechanical switch.

8. The switch of claim 7, wherein said logic circuit can determine whether the switch is to operate in a two- or three-terminal mode.

9. The switch of claim 8, wherein:
   said logic circuit opens the switch in the two terminal mode if an amount of current flowing through the switch exceeds a predetermined maximum magnitude; and
   said logic circuit limits the amount of current flowing through the switch in the three terminal mode to the predetermined maximum magnitude.

10. The switch of claim 8, wherein said power stealing circuit can function independent of voltage polarity in the two-terminal mode or the three-terminal mode.

11. The switch of claim 10, further comprising a mechanical plunger that can affect said variable capacitor sensor to actuate the switch.

12. The switch of claim 11, wherein said logic circuit provides the switch with break-before-make timing.

13. A solid state switch comprising:
   an actuator;
   a logic circuit coupled to said actuator;
   a power stealing circuit coupled to said actuator and said logic circuit; and
   a power output circuit in electrical communication with said logic circuit and said power stealing circuit; and wherein:
   said power output circuit is in electrical communication with at least two terminals; and
   said power stealing circuit provides power to the switch from terminals of the switch.

14. The switch of claim 13, further comprising a charge pump for providing an appropriate voltage for the switch from a source of voltage of about 0.5 volt.

15. The switch of claim 14, wherein said actuator provides a mechanical-to-electrical actuation of the switch.

16. The switch of claim 15, wherein said switch is polarity independent.

17. The switch of claim 16, wherein said switch can operate in a two- or three-wire mode.

18. The switch of claim 17, wherein said logic circuit provides for break-before-make timing.

19. A solid state switch comprising:

actuator means for providing mechanical-to-electrical actuation, having electrical hysteresis;

logic means, coupled to said actuator means, for providing break before make timing of the switch;

output means, coupled to said logic means, for making and breaking contact;

terminal means, coupled to said output means, for coupling to an external circuit to be switched by said output means; and stealing means, coupled to said logic means, output means and terminal means, for obtaining power from the external circuit via said terminal means.

20. The switch of claim 19, further comprising:

voltage buss means, coupled to said actuator means, said logic means, said output means, and said stealing means, for carrying power to said means;

pump means, coupled to said voltage buss means and said terminal means, for converting electrical power having a voltage insufficient for said voltage buss means to electrical power having a voltage sufficient for said voltage buss means;

regulating means, coupled to said voltage buss means and to said stealing means, for taking electrical power from said stealing means and converting it to electrical power having a regulated voltage for said voltage means; and selection means, coupled to said voltage buss means, said pump means, and said regulating means, for selecting a source of power for said voltage buss means from said pump means or said regulating means.

* * * * *

UNITED STATES PATENT AND TRADEMARK OFFICE
CERTIFICATE OF CORRECTION

PATENT NO. : 6,288,458 B1
DATED : September 11, 2001
INVENTOR(S) : Dale F. Berndt It is certified that error appears in the above-identified patent and that said Letters Patent is hereby corrected as shown below:

<u>Title page,</u>
Item [75], Inventor, add -- Richard A. Alderman --

Signed and Sealed this

Twentieth Day of July, 2004

JON W. DUDAS
*Acting Director of the United States Patent and Trademark Office*